United States Patent
Parker et al.

(10) Patent No.: US 6,861,462 B2
(45) Date of Patent: Mar. 1, 2005

(54) NANOCOMPOSITE FORMED IN SITU WITHIN AN ELASTOMER AND ARTICLE HAVING COMPONENT COMPRISED THEREOF

(75) Inventors: Dane Kenton Parker, Massillon, OH (US); Brent Kevin Larson, Fairlawn, OH (US); Xiaoping Yang, Streetsboro, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 453 days.

(21) Appl. No.: 10/037,539

(22) Filed: Dec. 21, 2001

(65) Prior Publication Data

US 2004/0054059 A1 Mar. 18, 2004

(51) Int. Cl.$^7$ ................................................ C08K 3/34
(52) U.S. Cl. ....................... 524/445; 524/495; 524/493; 501/145; 501/148
(58) Field of Search ................................ 524/495, 493, 524/496, 186, 445, 447, 446, 449

(56) References Cited

U.S. PATENT DOCUMENTS

| | | | |
|---|---|---|---|
| 4,431,755 A | 2/1984 | Weber et al. ................ | 523/203 |
| 4,739,007 A | 4/1988 | Okada et al. ................ | 524/789 |
| 4,810,734 A | 3/1989 | Kawasumi ................... | 523/216 |
| 5,385,776 A | 1/1995 | Maxfield et al. ............ | 428/297 |
| 5,476,913 A | 12/1995 | Kourai et al. ............... | 526/310 |
| 5,552,469 A | 9/1996 | Beall et al. .................. | 524/445 |
| 5,578,672 A | 11/1996 | Beall et al. .................. | 524/446 |
| 5,840,796 A | 11/1998 | Badesha et al. ............. | 524/449 |
| 5,883,173 A | 3/1999 | Elspass et al. .............. | 524/446 |

FOREIGN PATENT DOCUMENTS

| WO | WO 97/00910 | * | 1/1997 |
|---|---|---|---|
| WO | WO 2004005387 | * | 1/2004 |
| WO | WO 2004005388 | * | 1/2004 |

OTHER PUBLICATIONS

"Synthesis and Characterization of PMMA Nanocomposites by Suspension and Emulsion Polymerization" by Haung and Brittain, *Macromolecules 2001*, and published on the Web on Apr. 13, 2001.

* cited by examiner

*Primary Examiner*—Katarzyna Wyrozebski
(74) *Attorney, Agent, or Firm*—Henry C. Young, Jr.

(57) ABSTRACT

This invention relates to preparation and use of nanocomposites formed in situ within an elastomer host wherein the nanocomposite is comprised of an elastomer matrix and a dispersion therein of at least partially exfoliated clay platelets. Rubber composites can be prepared by blending such nanocomposite with additional elastomer(s), additional reinforcing filler(s) and/or a coupling agent. The invention further relates to the preparation of articles of manufacture, including tires, having at least one component comprised of said nanocomposite or said rubber composite. Such a tire component may be selected from, for example, tire tread and tire innerliner.

27 Claims, No Drawings

NANOCOMPOSITE FORMED IN SITU WITHIN AN ELASTOMER AND ARTICLE HAVING COMPONENT COMPRISED THEREOF

FIELD OF THE INVENTION

This invention relates to preparation and use of nanocomposites comprised of an elastomer matrix which contains a dispersion therein of at least partially exfoliated platelets of an intercalated, multilayered, water swellable clay which contains cationically exchangeable ions in its galleries between layers (e.g. a smectite clay such as, for example, montmorillonite clay) wherein the exfoliated platelets are created in situ by combining an elastomer latex of positively charged elastomer particles with an aqueous dispersion of the clay. The exfoliated platelets are derived from such intercalated clay formed by an in situ cation exchange phenomenon between cationically exchangeable ions within the galleries between the stacked platelets of the multilayered clay with a preformed latex of cationic (positively charged) elastomer particles.

Said positively charged latex elastomer particles may be prepared by free radical emulsion polymerization using:

(A) a non-polymerizable cationic surfactant, and/or (B) a polymerizable cationic surfactant.

Optionally, an additional cationic charge may be incorporated onto the cationic elastomer latex particles through the use and in the presence of:

(C) a polymerizable comonomer bearing a cationic charge, (D) a free radical generating polymerization initiator bearing a cationic charge, and/or (E) a free radical chain transfer agent bearing a cationic charge.

Such free radical induced emulsion polymerizations are exclusive of a thermoplastic polymer latex and are exclusive of the presence of an anionic surfactant. Rubber composites can be prepared by blending such nanocomposite with additional elastomer(s), additional reinforcing filler(s) and/or a coupling agent. The invention further relates to the preparation of articles of manufacture, including tires, having at least one component comprised of said nanocomposite or said rubber composite. Such a tire component may be selected from, for example, tire tread and tire innerliner.

BACKGROUND OF THE INVENTION

Nanocomposites of thermoplastic polymers and/or elastomers which contain a dispersion of particles of intercalated, and possibly partially exfoliated, clay have heretofore been prepared, for example, by pre-intercalating a multi-layered, hydrophilic water-swellable clay in water which contains an intercalating compound (e.g. a quaternary ammonium salt) to form an organoclay followed by drying the organoclay to form an organoclay powder. The organoclay is then mixed with an elastomer to form a dispersion thereof in the elastomer. To a small extent, the layers of the intercalated clay (the organoclay) may become delaminated, or exfoliated, into individual platelets, including delaminated stacks of platelets, either during the intercalation process or upon high shear mixing with the elastomer.

Such a method is considered herein to be excessively process dependent and relatively inefficient insofar as obtaining a dispersion of substantially exfoliated platelets of an intercalated water-swellable clay within an elastomer matrix and therefore likely to be excessively costly to implement in a rubber product manufacturing operation.

In order to enhance reinforcement of elastomer-based components of articles of manufacture, particularly tires and more particularly tire treads, it is considered herein that it is desirable to present the water-swellable clay in a maximized state of exfoliation (e.g. maximized individual platelet formation with a uniform distribution of said platelets within the elastomer composition).

Such an exfoliation process is contemplated by utilizing an ion exchange phenomenon between cation exchangeable ions contained within the galleries of stacked platelets of a water-swellable clay composed of multiple layers of negatively charged stacked platelets and cationically (positively) charged elastomer particles contained in an aqueous latex of the elastomer particles. By such method the exfoliated platelets are thereby created in situ.

The exfoliation process for this invention is conducted to the exclusion of a thermoplastic polymer latex and to the exclusion of more conventional anionic (negatively charged) elastomer particles derived from an elastomer latex stabilized with an anionic-type surfactant.

The exfoliation maximization is based, at least in part, upon a destabilization of the elastomer latex particles due to the aforesaid ion exchange phenomenon between the cationically charged elastomer particles in the latex with cation exchangeable ions within the galleries of the stacked platelets of the water-swellable clay to cause an intercalation/exfoliation of the clay, thereby causing the elastomer particles to coagulate. The relatively bulky cationically charged (positively charged) coagulated elastomer particles, in turn, enter the galleries of the negatively charged stacked platelets to further expand the distance between the platelets and further promote a bonding of the elastomer particles to the surface of the platelets which consequently results in a more complete exfoliation (delamination) of the platelets.

Moreover, by operation of this invention, a relatively hydrophilic water-swellable clay is substantially converted to more hydrophobic exfoliated platelets, which may include intercalated stacks of platelets, which are more compatible with diene-based elastomers and therefore more suitable for dispersion therein the as particulate reinforcement therefor.

The nanocomposites of this invention may also be used to create rubber composites as blends of such nanocomposites with other elastomers, ingredients and/or coupling agents which may be used as components of articles of manufacture, including tires. Thus such articles of manufactures may be composed of a rubber composition comprised of said nanocomposite and/or said rubber composite.

Indeed, while some aspects of the process might appear to be somewhat simplistic in operational nature, it is considered herein that the overall technical procedural application is novel, a departure from past practice and inventive. This is particularly considered herein to be true where nanocomposites in a form of exfoliated, hydrophobic, platelet reinforced elastomer compositions are desired for use in composites of articles of manufacture such as components for tires.

In practice, the complete exfoliation of the polymer-bound platelets can be determined, for example, by wide angle X-ray diffraction (WAXD) as evidenced by a substantial absence of an X-ray peak. Information concerning the intermediate partially exfoliated/intercalated state within the elastomer matrix can be qualitatively obtained by observing WAXD peak intensities and changes (increase) in the basal plane spacing between platelets.

It is appreciated that preparation of thermoplastic polymer/clay nanocomposites has heretofore been reported in *Synthesis and Characterization of PMMA Nanocomposites by Suspension and Emulsion Polymerization* by Haung and Brittain, Macromolecules 2001, 34, 3255 through 3260, published on the Web on Apr. 13, 2001. There, it has been suggested to introduce a smectite clay, which is said to be composed of silicate layers, into a pre-formed thermoplastic polymer latex such as, for example a poly(methyl methacrylate), or PMMA, latex, which contains a cationic surfactant, which may be a polymerizable surfactant, and which relies upon an interaction of the cations of the surfactant with anionic charges on the clay platelets and to which polymers of the polymerizable surfactant may become tethered to the surface of the platelets. It is understood herein, from the publication, that exfoliation of the platelets is obtained upon melt processing of the thermoplastic based nanocomposite. A significant purpose in the preparation of such a thermoplastic nanocomposite polymer of methyl methacrylate is understood to be enhanced heat durability of the poly(methylmethacrylate) thermoplastic polymer without a sacrifice in its clarity.

It is important to appreciate, however, that a significant aspect of this invention (to avoid confusion with the above referenced Brittain system) is that a multilayered water swellable clay which contains cationically exchangeable ions within the galleries between its layers (e.g. a smectite clay) is intercalated and at least partially, and preferably substantially, exfoliated in the presence of cationic elastomer latex to the exclusion of a thermoplastic polymer latex, and to the exclusion of a latex which contains an anionic surfactant, where an enhanced utility in the reinforcement of elastomer compositions is desired to promote enhancement of, for example, one or more elastomeric physical properties such as ultimate tensile strength, modulus (e.g. 300 percent modulus) and/or abrasion resistance properties of a vulcanized elastomer composition, particularly for components of articles of manufacture such as tires and particularly for rubber tire treads.

Multi-layered, stacked clay particles, (e.g. montmorillonite clay) have also reported in U.S. Pat. No. 5,883,173 in which a latex is provided comprised of water, surfactant, and layered clay having an interlayer separation and a cationic exchange capacity, wherein layered clay is intercalated by in situ polymerization of monomers selected from, for example, styrene and butadiene to thereby expand the interlayer separation of layered clay. It is not seen that such patent is directed to any spontaneous coagulation of a pre-formed latex via a cation exchange process.

In the practice of this invention, (to avoid confusion of said U.S. Pat. No. 5,883,173) and contrary to such patent teaching, a nanocomposite of an elastomer matrix and a dispersion therein of exfoliated platelets is required to be prepared by an ion exchange between ion exchangeable ions in the galleries of stacked platelets of a water-swellable clay and cations contained on pre-formed elastomer particles in an elastomer latex in which the pre-formed latex is spontaneously coagulated.

In particular, for this invention the water-swellable clay is introduced to said latex as a water dispersion of the clay which does not contain an intercalant for the clay so that the clay is not pre-intercalated with an intercalant prior to addition to the latex. The clay, of course, contains cation exchangeable ions within the galleries between the stacked platelets of the clay which are somewhat swollen by the water in which the clay is dispersed prior to its addition to the latex. The latex itself, to which the water dispersion of the clay is added, is required to contain cationically charged elastomer particles which are available for an ion exchange with said cation exchangeable ions in the said galleries within the clay.

In practice, it is, in general, not intended that laticies of functionalized elastomer particles which are functionalized by containing carboxylic acid groups or aldehyde groups or epoxide groups on diene-based elastomers are used in this instant invention.

For the purposes of this instant invention, the latex of positively charged elastomer particles (cationically charged elastomer particles) is procedurally prepared by free radical emulsion polymerization using:

(A) a non-polymerizable cationic surfactant, and/or (B) a polymerizable cationic surfactant.

Optionally, additional cationic charge may be incorporated onto the cationic elastomer latex particles, during the polymerization of the monomers to form the elastomer latex particles, through the use and in the presence of:

(C) a polymerizable, non-surfactant, comonomer bearing a cationic charge, (D) a free radical generating polymerization initiator bearing a cationic charge, and/or (E) a free radical chain transfer agent bearing a cationic charge.

The case of practicing this invention by preparing a nanocomposite by blending a water/water-swellable clay dispersion with a latex prepared by procedure (A) above, it is considered herein that a partial exfoliation of platelets occurs, dependant somewhat upon a degree of migration of relatively bulky, coagulated elastomer particles into the galleries between the platelets of the intercalated clay (the clay being intercalated by the aforesaid ion exchange between the cationic ions of the cationic surfactant and the cation exchangeable ions in the said galleries).

The case of practicing this invention by preparing a nanocomposite by blending a water/water-swellable clay dispersion with a latex prepared by the procedure (B) above, it is considered herein that a more substantial exfoliation of individual platelets occurs in which the cationic surfactant portion of the latex, which is polymer-bound to the coagulated elastomer particles, ion exchanges with the cation exchangeable ions within the clay platelet galleries and therefore causes the cationically charged coagulated elastomer particles to enter the galleries and to which the relatively bulky elastomer particles become polymer-bound to the surfaces of the positively charged surfaces of the clay platelets which, in turn causes the galleries to expand and to promote a substantial exfoliation (delamination) of the platelets from the clay as a dispersion thereof into the polymer matrix itself.

The case of practicing this invention by preparing a nanocomposite by blending a water/water-swellable clay dispersion with a latex prepared by optional procedure (C) or by optional procedure (D) above, it is considered herein that a more substantial exfoliation of individual platelets occurs, as compared to procedure A or B, in which the cationic, free radical generating polymerization agent creates cations on the surface of the resultant elastomer particles in the elastomer latex. The resultant cationically charged elastomer particles in the latex ion exchange with the cation exchangeable ions within the clay platelet galleries so that the cationically charged coagulated elastomer particles enter the galleries in a manner that the relatively bulky, elastomer particles become polymer-bound to the surfaces of the positively charged surfaces of the clay platelets which, in turn causes the galleries to expand and to promote a substantial exfoliation (delamination) of the platelets from the clay as a dispersion thereof into the polymer matrix itself.

The case of practicing this invention by preparing a nanocomposite by blending a water/water-swellable clay dispersion with a latex prepared by optional procedure (E) above, it is considered herein that a more substantial exfoliation of individual platelets occurs in which the cationically charged chain transfer agent (e.g. 2-aminophenyldisulfide dihydrochloride) is introduced to the free radical polymerization. The chain transfer agent thereby creates cations on the surface of the resultant elastomer particles in the elastomer latex. The resultant cationically charged elastomer particles in the latex ion exchange with the cation exchangeable ions within the clay platelet galleries so that the cationically charged coagulated elastomer particles enter the galleries in a manner that the relatively bulky, elastomer particles become polymer-bound to the surfaces of the positively charged surfaces of the clay platelets which, in turn causes the galleries to expand and to promote a substantial exfoliation (delamination) of the platelets from the clay as a dispersion thereof into the polymer matrix itself Water-swellable clays considered for use in this invention which are clays composed of a plurality of stacked platelets (e.g. very thin silicate based platelets) which contain cationically exchangeable ions in the galleries between such platelets. Representative of such clays are water swellable smectite clays, vermiculite based clays and mica based clays. Preferably such water-swellable clays are smectite clays. Representative of smectite clays are, for example, montmorillonite, hectorite, nontrite, beidellite, volkonskoite, saponite, sauconite, sobockite, sterensite, and sinfordite clays of which montmorillonite and hectorite clays are preferred. For various exemplary smectite clays, see for example U.S. Pat. No. 5,552,469. Such cationically exchangeable ions contained in such galleries are typically comprised of at least one of sodium ions and potassium ions, which may include calcium ions and/or magnesium ions, although it is understood that additional cationically exchangeable ions may be present. Typically, montmorillonite clay is preferred which contains sodium ions in such galleries, although it is understood that a minor amount of additional cationically exchangeable ions may be contained in such galleries such as for example, calcium ions.

It is to be appreciated that, in practice, emulsion polymerization derived elastomeric styrene/butadiene copolymers may be typically prepared, for example, by polymerizing the styrene and 1,3-butadiene monomers in a water emulsion medium via a free radical and redox polymerization initiators in the presence of an anionic surfactant. Representative examples of anionic surfactants may be found, for example, in *McCutcheon's*, Volume 1, "Emulsifiers & Detergents", North American Edition, 2001, Pages 291 and 292, with representative examples on non-ionic surfactants shown on Pages 294 through 300 and examples of cationic surfactants shown on Pages 300 and 301.

For the practice of this invention, anionic surfactants are to be excluded.

However, if desired, a minor amount of a nonionic surfactant might be used (e.g. from zero to about 20, alternately about 0.1 to about 20 weight percent) of non-ionic surfactant based on the total of surfactants used.

Accordingly, for the practice of this invention, a cationic elastomer latex of, for example elastomers derived from suitable monomers to yield elastomers such as, for example, styrene/butadiene rubber, cis 1,4-polybutadiene rubber and/or butadiene/acrylonitrile rubber, is required to be made as a result of free radically polymerizing the elastomer precursor monomers such as, for example, a combination of styrene and 1,3-butadiene monomers, 1,3-butadiene individually, or a combination of 1,3-butadiene and acrylonitrile. Preferably, the elastomer is a styrene/butadiene elastomer.

By requiring an aqueous dispersion of a water-swellable clay (e.g. smectite clay) which does not contain an intercalant (e.g. does not contain a quaternary ammonium salt), in a water-swollen state where the galleries between platelets are expanded somewhat by being swollen with water, to be blended with a pre-formed cationic latex of the elastomer particles to cause an ion exchange to occur between the cationic latex and the cationically ion exchangeable ions within the swollen galleries of the clay (e.g. smectite clay), the practice of this invention is significantly different from:

(A) simply requiring a polymerization of the respective monomers to occur in the presence of a smectite clay, whether or not the latex itself is a cationic latex and (B) simply coagulating the elastomer from an elastomer latex by a typical salt/acid elastomer coagulation method.

Therefore, for this invention, the smectite clay is intercalated and exfoliated, preferably substantially exfoliated, into platelets, preferably polymer-bound platelets) within the elastomer (A) after the elastomer is pre-formed by polymerization of monomers such as, for example, styrene and 1,3-butadiene, in a water based medium to form a cationic elastomer latex, and (B) prior to, or simultaneously with, the coagulation of the elastomer from the cationic latex.

Therefore, the water-swellable clay (e.g. smectite clay) is (A) not intercalated during the polymerization of the monomers, (B) not intercalated by physically blending the smectite clay with the elastomer after it has been coagulated and recovered as a dry elastomer and (C) not intercalated by blending a smectite clay which has been pre-intercalated by treatment with a quaternary ammonium salt prior to blending the pre-intercalated clay with the elastomer.

As hereinbefore discussed, it is an important aspect of the invention that the cationic nature of the surface of the elastomer particles stabilize the elastomer particles in the latex and keep the elastomer particles from coagulating. However, by operation of this invention, the cations undergo an ion exchange with cation exchangeable ions (e.g. sodium ions) within the galleries between the platelets of the smectite clay to cause (A) the cations to be withdrawn from the presence of the elastomer particles (in the case of the cation surfactant) and to thereby destabilize the latex (causing the elastomer particles to coagulate) and (B) substantially essentially simultaneously (during the coagulation process of the elastomer particles) expand the distance between the plates of the clay to form expanded galleries (by exchanging the ions such as sodium ions in the galleries between the stacked platelets of the clay with the more bulky cations from the cationic surfactant) and therefore intercalate and exfoliate the clay and (c) allowing the destabilized elastomer particles to coagulate.

In this manner, then, the method of creating a nanocomposite as a dispersion of intercalated, preferably substan tially exfoliated, platelets, preferably polymer-bound platelets, of the clay (e.g. smectite clay) within an elastomer host is considered herein to be novel and a departure from past practice and, moreover, it is considered herein that the resulting nanocomposite of the elastomer and dispersion of substantially exfoliated polymer-bound platelets prepared by such process is also novel and a departure from past practice.

Historically, blending of an organoclay with a thermoplastic or thermosetting polymer by a melt blending process is discussed in U.S. Pat. Nos. 4,739,007; 4,810,734; 5,385,776; 5,578,672 and 5,840,796. Historically, blending of an adduct of a mineral filler such as, for example, a montmorillonite clay, and a quaternary ammonium salt with at least one rubber and an organosilane is discussed in U.S. Pat. No. 4,431,755.

In one aspect, a montmorillonite clay, for use in this invention, might be described, for example, as a naturally occurring clay of a structure which is composed of a plurality of stacked, thin and relatively flat, layers, where such individual layers may be of a structure viewed as being composed of very thin octahedral shaped alumina layer sandwiched between two very thin tetrahedrally shaped silica layers to form an aluminosilicate structure. Generally, for such aluminosilicate structure in the naturally occurring montmorillonite clay, some of the aluminum cations ($Al^{+3}$) are viewed as having been replaced by magnesium cations ($Mg^{+2}$) which results in a net negative charge to the platelet layers of the clay structure. Such negative charge is viewed as being balanced in the naturally occurring clay with hydrated sodium, lithium, magnesium, calcium and/or potassium cations, usually primarily sodium ions, within the spacing (sometimes referred to as "galleries") between the aforesaid aluminosilicate layers, or platelets.

In the description of this invention, the term "phr" is used to designate parts by weight of a material per 100 parts by weight of elastomer. The terms "rubber" and "elastomer" may be used interchangeably unless otherwise indicated. The terms "vulcanized" and "cured" may be used interchangeably, as well as "unvulcanized" or "uncured", unless otherwise indicated.

SUMMARY AND PRACTICE OF THE INVENTION

In accordance with this invention, a process of preparing a nanocomposite comprised of an elastomer and at least partially exfoliated platelets from a water-swellable clay, (in situ within an elastomer host of cationic elastomer particles), comprises blending:

(A) an aqueous pre-formed elastomer latex, preferably exclusive of a thermoplastic polymer latex, comprised of elastomer particles with cations on the surface thereof prepared by aqueous free radical induced polymerization of monomers in the presence of a free radical generating polymerization initiator and surfactant;

wherein said monomers are comprised of:

(1) styrene and 1,3-butadiene monomers which contain from about 0.1 to about 40, alternately about 15 to about 35, weight percent styrene monomer, (2) styrene and isoprene monomers which contain from about 0.1 to about 40, alternately about 15 to about 35, weight percent styrene monomer, (3) isoprene monomer, (4) 1,3-butadiene monomer, (5) isoprene and 1,3-butadiene monomers (6) 1,3-butadiene and acrylonitrile monomers which contain from about 5 to about 45 weight percent acrylonitrile monomer; or (7) isoprene and acrylonitrile monomers which contain from about 5 to about 45 weight percent acrylonitrile monomer wherein said free radical generating polymerization initiator is selected from:

(1) a cationic aqueous polymerization initiator (which adds a cationic charge to the resultant elastomer particles in the latex), (2) an anionic aqueous polymerization initiator, or (3) neutral aqueous polymerization initiator (which does not add a charge to the resultant elastomer particles in the latex), or (4) a redox free radical initiator system;

wherein said elastomeric polymer particles are stabilized in said latex by a surfactant selected from:

(1) non free-radically polymerizable cationic surfactant, and/or (2) free-radically polymerizable cationic surfactant;

(B) an aqueous mixture of water and a multilayered water-swellable clay which contains cationically exchangeable ion in its galleries between said layers, (e.g. smectite clay), exclusive of an intercalant for said clay, wherein said water-swellable clay is comprised of a plurality of stacked platelets with water-swollen (expanded) galleries between said platelets, wherein said galleries contain cationic ion exchangeable ions therein, which may be naturally occurring, (e.g. montmorillonite clay which contains sodium ions within said galleries).

In practice, it is considered that said method relies, at least in part, upon an ion exchange between said cations on the surface of said relatively bulky elastomer particles of said elastomer latex and said cationically exchangeable ion(s) in said galleries between said stacked platelets of said clay and to thereby expand the separation between individual platelets of the clay and create at least partially exfoliated platelets and to destabilize and coagulate said elastomer particles from said latex to thereby create a nanocomposite comprised of a dispersion of said at least partially exfoliated platelets within the matrix of said coagulated latex particles.

In practice, where said method of nanocomposite preparation is based upon use of a non-polymerizable cationic surfactant to provide cations for the surface of said elastomer particles in said elastomer latex, it is considered herein, upon said ion exchange and said elastomer particle coagulation, that at least a portion of said coagulated elastomer particles enter the galleries between said stacked platelets to partially exfoliate said platelets in the formation of said nanocomposite.

In practice, where said method of nanocomposite preparation is based upon use of a free radically polymerizable cationic surfactant to provide cations bound to the surface of said elastomer particles in said elastomer latex, it is considered herein, upon said ion exchange and said polymer particle coagulation, at least a portion of said cationically charged elastomer particles enter the galleries between said stacked platelets of said water-swellable clay and becomes polymer-bound to the surface of at least a portion of said platelets, as a result of interaction between said cationically charged elastomer particles and platelets which are negatively charged, to substantially exfoliate said platelets.

In practice, where said method of nanocomposite preparation is based upon the optional use of a cationic free radical generating polymerization initiator to provide cat ions on the surface of said elastomer particles in said elastomer latex, it is considered herein, upon said ion exchange and said polymer particle coagulation, at least a portion of said cationically charged elastomer particles enter the galleries between said stacked platelets of said water-swellable clay and becomes polymer-bound to the surface of at least a portion of said platelets, as a result of interaction between said cationically charged elastomer particles and said platelets which are negatively charged, to substantially exfoliate said platelets.

In practice, where said method of nanocomposite preparation is based upon the optional use of a cationically charged chain transfer agent to provide cations on the surface of said elastomer particles in said elastomer latex, it is considered herein, upon said ion exchange and said polymer particle coagulation, at least a portion of said cationically charged elastomer particles enter the galleries between said stacked platelets of said water swellable clay and becomes polymer-bound to the surface of at least a portion of said platelets, as a result of interaction between said cationically charged elastomer particles and said platelets which are negatively charged, to substantially exfoliate said platelets.

In further practice of the invention, said monomers for preparation of said pre-formed elastomer may also contain a minor amount (e.g. from about 0.1 to about 20, alternately about 0.1 to about 10, weight percent based on the total monomers) of additional copolymerizable monomers comprised of alkyl acrylates, alkyl methacrylates, acrylamide, methacrylamide, N-alkylacrylamide, N-alkyl methacrylamide, N,N-dialkyl acrylamide and N,N-dialkyl methacrylamide, wherein said alkyl groups contain from one through four carbon atoms; alpha methylstyrene, 2-vinyl pyridine and 4-vinyl pyridine.

Representative examples of said alkyl groups for said additional polymerizable monomers are, for example, methyl, ethyl, propyl and butyl groups.

In additional practice of the invention, said monomers for the preparation of said pre-formed elastomer may also contain a minor amount (e.g. from about 0.1 to about 20, alternately about 0.1 to about 10), weight percent based on the total monomers) of an elastomer functionalizing monomer selected from, for example, hydroxypropyl acrylate, hydroxypropyl methacrylate (HPMA), 2-(dimethylamino) ethyl methacrylate, 4-anilinophenyl methacrylamide, 2-hydroxyethyl acrylate and 2-hydroxyethyl methacrylate.

In further accordance with this invention, a nanocomposite of an elastomer which contains a dispersion therein of said in situ formed organoclay and at least partially exfoliated platelets thereof is provided as prepared by the process of this invention which relies solely upon the use of a non-polymerizable cationic surfactant to provide cations for the surface of the elastomer particles of the elastomer latex.

In further accordance with this invention, a nanocomposite of an elastomer which contains a dispersion therein of said in situ formed organoclay and substantially exfoliated platelets thereof is provided as prepared by the process of this invention where cations are provided for the surface of the elastomer particles of said elastomer latex by the combined use of both a non-polymerizable and a free radical polymerizable cationic surfactant, optionally in the presence of a free radical generating polymerization initiator bearing a cationic charge and/or a cationically charged chain transfer agent.

It is important to appreciate that the amount of clay (e.g. smectite clay) to be treated, and therefore the amount of exfoliated polymer-bound platelets to be contained in the nanocomposite, is limited by the available amount of cationic component provided by the cationic surfactant and/or the other cationic components provided by said cationic free radical initiator and/or cationic chain transfer agent contained in the elastomer latex.

Typically only a limited, stabilizing, amount of surfactant is used in the polymerization of the monomers to create the elastomer latex in order to prevent uncontrollable reaction rates, etc.

Therefore, if it is desired to quantitatively surface treat a significant amount of the water-swellable clay (e.g. smectite clay) and the normally available cationic surfactant in the elastomer latex is insufficient to ion exchange with all, or substantially all, of the cationic ion exchangeable ions within the galleries of the water-swellable clay, then an incomplete surface treatment of the clay will occur. The inherent result is that the resultant nanocomposite may be composed of the elastomer which contains a dispersion thereon of both a surface treated clay and a significant quantity of non-surface treated clay which is considered herein to be effective only as a filler for the elastomer and not an effective particulate reinforcement.

In practice, the amount of cationic surfactant contained in the latex is conventionally limited to an amount necessary to maintain the emulsion, or suspension of the elastomer particles in the latex. An excess of cationic surfactant is usually not desired because of resultant uncontrollable polymerization rate and resultant relatively high viscosity latex.

Accordingly, the effective amount of the water-swellable clay (e.g. smectite clay) to be added to the latex for an effective interactive ion exchange between the surfactant and cation exchangeable ions within the galleries of the water-swellable clay is limited by the amount of cationic surfactant contained in the formative latex.

Therefore, in further accordance with this invention, said process of preparing a nanocomposite of an elastomer and dispersion therein of polymer bound, substantially exfoliated particles in situ within an elastomer host is modified wherein said process additionally comprises:

(A) using an emulsion stabilizing amount of said cationic surfactant during said polymerization of said monomers to prevent coagulation of resultant elastomer particles from said latex, (B) adding an increased amount of the same or additional cationic surfactant to said latex, following completion of said polymerization of said monomers, to increase the amount of cationic surfactant available for ion exchange with cationic exchangeable ions contained in the galleries of said water-swellable clay (e.g. smectite clay), and thereafter, (C) blending said resulting latex, which contains said increased amount of cationic surfactant, with said water-swellable clay in an amount of said smectite clay based upon substantially equivalent cationic ions of the total of said cationic surfactant(s) to said cationic ion exchangeable ions in said galleries of the clay.

It is considered herein that modified process of preparing said nanocomposite is novel and a departure from the otherwise practice of this invention.

The modified process is considered herein to be significant because it allows higher clay loadings in the nanocomposite with the increased amount of the water-swellable clay (e.g. smectite clay) being in situ surface treated to form polymer loaded, substantially exfoliated platelets.

In additional accordance with this invention, a rubber composite is provided as a blend of at least one additional elastomer and said nanocomposite, as well as a process of preparing a rubber composite by preparing said nanocomposite and then blending at least one elastomer, particularly a diene-based elastomer, therewith.

In further accordance with this invention an article of manufacture is provided having at least one component comprised of said nanocomposite and/or said rubber composite, as well as a process of preparing an article of manufacture composite by preparing said nanocomposite and/or said rubber composite and then preparing said article of manufacture.

In additional accordance with this invention, a tire is provided having at least one component comprised of said nanocomposite and/or said rubber composite. In one aspect of the invention, said component may be, for example, a tire tread, as well as a process of preparing a tire by preparing said nanocomposite and/or said rubber composite and then preparing said tire.

In practice, said emulsion polymerization prepared cationic elastomeric copolymer latex is composed of water, elastomer particles, and one or more of a polymerizable cationic surfactant, non-polymerizable cationic surfactant, which act(s) as a stabilizer for the latex to aid in inhibiting the elastomer from coagulating from the latex as well as free radical polymerization initiator. The latex itself may be prepared, for example, by a free radical polymerization of the monomers in a water-based medium in the presence of a free radical initiator and said cationic surfactant(s). A general description of an aqueous emulsion polymerization of styrene and 1,3-butadiene, albeit directed to an anionic surfactant (emulsifier) based polymerization, may be found, for example, in *The Vanderbilt Rubber Handbook,* 1978 Edition, Pages 55 through 61.

Representative of the following cationic, anionic, neutral and redox free radical initiators are presented for illustrative purposes and are understood to be well known to those skilled in such art, although the invention is not intended to be limited to the following exemplary free radical polymerization initiators. In practice, often a cationic free radical polymerization initiator is preferred.

Representative of cationic free radical generating polymerization initiators are, for example, 2,2'azobis(2-methylpropionamidine) dihydrochloride and 2,2'azobis(N, N' dimethyleneisobutyramidine) dihydrochloride.

Representative of anionic free radical generating polymerization initiators are, for example potassium peroxydisulfate and ammonium peroxydisulfate. Such compounds are considered to be thermally unstable and decompose at a moderate rate to release free radicals. For example, a combination of the potassium peroxydisulfate with a mercaptan such as dodecyl mercaptan may be used to co-polymerize styrene and 1,3-butadiene wherein the dodecyl mercaptan is considered to act to promote formation of free radicals from the potassium peroxydisulfate as well as to limit, or control, the molecular weight of the copolymer elastomer.

Representative of neutral free radical generating polymerization initiators are, for example, benzoyl peroxide and azobisisobutyrolnitrile.

Representative of redox free radical generating polymerization initiators are a combination of materials which release free radicals and are well known to those skilled in such art. For example, redox polymerization initiator systems are described by G. S. Misra and U. D. Bajpai in *Prog. Polymer Science,* Volume 8, Pages 61 through 131 (1982).

The use of such free radical generating initiators for aqueous emulsion of styrene/butadiene monomer systems to form styrene/butadiene elastomers is well known to those having skill in such art.

Representative examples of non-free radically polymerizable cationic surfactants (e.g. cationic surfactants which do not readily undergo a free radical promoted polymerization in an aqueous medium) are chemicals having a surfactant activity in an aqueous medium in which they are present as cationic ions, such as, for example, various quaternary ammonium salts, various phosphonium salts and various sulfonium salts which are present as cationic ions in a water medium as is well known to those having skill in such art. For example, see U.S. Pat. No. 5,476,913. Also see L. H. Howland, et al, *Industrial & Engineering Chemistry,* Volume 44(4), Page 762 (1952). Representative of a non-free radically polymerizable cationic surfactant is, for example, cetyltrimethylammonium bromide (CTAB), or cetyltrimethylammonium chloride although the practice of the invention is not intended to be limited to such surfactant.

Representative of a cation-containing chain transfer agent is, for example, 2-aminophenyldisulfide dihydrochloride.

It should be appreciated that polymerizable cationic surfactants might also be polymerizable co-monomers in an aqueous medium but not necessarily visa versa.

Indeed, it is therefore to be appreciated that cationically polymerizable monomers in an aqueous medium are not necessarily polymerizable cationic surfactants.

Exemplary of compounds which exhibit at least some surfactant properties which may also be polymerizable monomers in an aqueous medium may be found, for example, in the reference: *Polymer,* 28, Page 325 (1987) by S. M. Hamid and D. C. Sherrintgton. In Table 2 of the reference, it is demonstrated that only quaternary salts of 2-dimethylaminoethyl methacrylate prepared from alkyl halides containing greater than seven carbon atoms exhibit a cmc (critical micelle concentration) in water at room temperature. With less than seven carbon atoms, the illustrated compounds are indicated to be suitable as polymerizable monomers but not as polymerizable surfactants.

In practice, non-free radially polymerizable cationic surfactants/monomers may be optionally be used in combination with free radically polymerizable cationic surfactants.

Also, it is contemplated herein that said non-free radically polymerizable cationic surfactant and/or free radically polymerizable cationic surfactant may contain from about 1 to about 20 weight percent non-ionic surfactant (based upon the total of said surfactants).

The use of cationic surfactants for emulsion polymerization of monomers such as isoprene, 1,3-butadiene and styrene to form polyisoprene, polybutadiene, styrene/isoprene, or styrene/butadiene elastomers, while being known, is believed herein to be a departure from conventional practice.

Representative examples of free radically polymerizable surfactants are surfactants which contain free radically polymerizable groups such as for example, acrylate groups, methacrylate groups, styrl groups, acrylamide groups, methacrylamide groups and allyl groups.

Representative of such free radically polymerizable cationic surfactants are, for example, alkyl bromide (or chloride) quaternary salts of 2-dimethylaminoethyl methacrylate, polymerizable acrylate and methacrylate mono and diquaternary ammonium salts, alkyl bromide (or chloride) quaternary salts of meta or para vinylbenzene dimethylamine, alkyl bromide (or chloride) quaternary salts of N,N dimethylallylamine, alkyl bromide (or chloride) quaternary salts of ortho or para vinyl pyridine, alkyl bromide (or chloride) salt of vinyl imidazole, N-((11-methacryloyloxy) undecyl)-4-methyl pyridinium bromide, 5-(para vinyl phenyl) pentyltrimethylammonium bromide, 11-methacrylolyundecyltrimethylammonium bromide, 11-acryloylundecyltrimethylammonium bromide, vinylbenzylamine hydrochloride, and aminoethylmethacrylate hydrochloride. For the above and additional polymerizable surfactants/monomers, see the *Journal of Applied Science*, Volume 65, Page 2315 (1957).

As hereinbefore discussed, the water-based dispersion of the multi-layered smectite clay is required to be exclusive of a intercalant (e.g. quaternary ammonium salt) so that intercalant-induced intercalation of the smectite clay occurs after a water dispersion of the smectite clay is mixed with the aqueous cationic elastomer emulsion.

Also, as hereinbefore discussed, it is considered herein that the smectite clay (e.g. montmorillonite clay) becomes more compatible with the elastomer (e.g. styrene/butadiene elastomer) host after its intercalation to a more hydrophobic form of the smectite clay, in situ within the elastomer host latex, as the intercalation of the smectite clay and coagulation of the elastomer from the latex occur substantially simultaneously. It is considered herein to be important that such intercalation of the smectite clay and coagulation of the already-formed elastomer occurs in this manner, instead of simply polymerizing the monomers to form the elastomer(s) in the presence of the clay followed by coagulation of the elastomer. Therefore, by the practice of this invention, it is considered herein that enable a more efficient intercalation flexibility is enabled by first producing the elastomer in a form of a latex and then producing the nanocomposite.

In the practice of this invention, the intercalation of the water-swellable clay (e.g. smectite clay) and substantially simultaneous coagulation of elastomer from the latex may be conducted, for example, by slowly adding the elastomer latex to the aqueous water-swellable clay dispersion, while agitating the clay/water dispersion. Such addition is considered herein to enable a good contact between the latex particles and water-swollen water-swellable clay particles.

As hereinbefore discussed, the clay/water does not contain an intercalant (e.g. does not contain a quaternary ammonium salt) to promote an ion exchange with sodium ions contained between the stacked layers of the water-swellable clay, although it is contemplated that the water-swellable clay in the water is in a water-swelled state so that the galleries between the stacked platelets are somewhat enlarged. For such procedure, the latex may be added, for example, at a temperature of about 20° C. to about 30° C. to an agitated dispersion of the clay in water having an elevated temperature in a range of about 40° C. to about 80° C. because it is considered herein that the clay is dispersed more readily in water at an elevated temperature. Such utilization of a clay/water dispersion at the elevated temperature, which is preferably at least 40° C. above the temperature of the latex being added to the dispersion, is considered herein to be useful in promoting a more efficient and substantially simultaneous combination of (A) the ion transfer mechanism of the cationically exchangeable ions (e.g. sodium ions) in the galleries between the stacked platelets of the water-swellable clay and the cationic surfactant, (B) a destabilization of the elastomer latex and thereby the elastomer particles, (C) the migration of the elastomer particles into the galleries between the platelets of the swollen, intercalated clay to aid in forming polymer-bound platelets (D) and a substantial exfoliation of the polymer-bound platelets within the elastomer host and (E) coagulation of the elastomer particles from the destabilized elastomer latex.

The substantially simultaneous effect of such steps, although a portion of the steps may be somewhat partially sequential in nature, is seen herein as promoting a more efficient cationic intercalation of the clay and substantial exfoliation of polymer-bound platelets and to effect a more efficient homogeneous dispersion of the intercalated clay and substantially exfoliated polymer-bound platelets thereof which may be the most significant resultant aspect of the invention for the formation of the thereby enhanced nanocomposite of this invention.

The resulting nanocomposite may be blended with additional elastomers to create a rubber composite. For example, rubber composites may be prepared by blending the nanocomposite with various additional diene-based elastomers such as, for example, homopolymers and copolymers of monomers selected from isoprene and 1,3-butadiene and copolymers of at least one diene selected from isoprene and 1,3-butadiene and a vinyl aromatic compound selected from styrene and alpha methylstyrene, preferably styrene.

Representative of such additional conjugated diene-based elastomers are, for example, cis 1,4-polyisoprene (natural and synthetic), cis 1,4-polybutadiene, styrene/butadiene copolymers (aqueous emulsion polymerization prepared and organic solvent solution polymerization prepared), medium vinyl polybutadiene having a vinyl 1,2-content in a range of about 15 to about 90 percent, isoprene/butadiene copolymers, styrene/isoprene/butadiene terpolymers. Tin coupled elastomers may also be used, such as, for example, tin coupled organic solution polymerization prepared styrene/butadiene co-polymers, isoprene/butadiene copolymers, styrene/isoprene copolymers, polybutadiene and styrene/isoprene/butadiene terpolymers.

In the further practice of this invention, particulate reinforcement for the nanocomposite and/or rubber composite, particularly the exfoliated platelets, may also include carbon black and/or particulate synthetic amorphous silica, particularly precipitated silica, or a combination of carbon black and such amorphous silica, usually of an amount in a range of about 5 to about 100 alternately about 5 to about 90, phr. If a combination of such carbon black and silica is used, usually at least about 5 phr of carbon black and at least 10 phr of silica are used. For example, a weight ratio of silica to carbon black ranging from about 1/5 to 5/1 might be used.

In further accordance with this invention, a rubber composition is provided which comprises, based upon parts by weight per 100 parts by weight elastomer (phr):

(A) about 5 to about 150, alternately about 5 to about 115, phr of the nanocomposite of this invention, (B) from zero to about 95, alternately from about 5 to about 95, phr of at least one additional diene-based elastomer, so long as the total of the elastomer contained in said nanocomposite and said additional diene-based elastomer is 100 parts by weight, (C) from zero to about 80, alternately from about 10 to about 80, alternately about 10 to about 60 phr of at least one additional reinforcing particulate filler selected from carbon black, precipitated silica aggregates, silica-containing carbon black which contains domains of silica on its surface, and mixtures thereof, and, optionally (D) a coupling agent which contains a moiety reactive with hydroxyl groups (e.g. silanol groups) contained on the peripheral edges of the surface of the platelets of said exfoliated platelets and reactive with hydroxyl groups (e.g. silanol groups) contained on the surface of said precipitated silica and said silica-containing carbon black, if said silica and/or silica-containing carbon black is used, and another moiety which is interactive with said diene-based elastomer(s) of the elastomer(s) of said nanocomposite and at least one of said additional elastomers.

Commonly employed synthetic amorphous silica, or siliceous pigments, used in rubber compounding applications can be used as the silica in this invention, wherein aggregates of precipitated silicas are usually preferred.

The precipitated silica aggregates preferably employed in this invention are precipitated silicas such as, for example, those obtained by the acidification of a soluble silicate, e.g., sodium silicate and may include coprecipitated silica and a minor amount of aluminum.

Such silicas might usually be characterized, for example, by having a BET surface area, as measured using nitrogen gas, preferably in the range of about 40 to about 600, and more usually in a range of about 50 to about 300 square meters per gram. The BET method of measuring surface area is described in the *Journal of the American Chemical Society*, Volume 60, Page 304 (1930).

The silica may also be typically characterized by having a dibutylphthalate (DBP) absorption value in a range of about 50 to about 400 cm3/100 g, and more usually about 100 to about 300 $cm^3/100$ g.

Various commercially available precipitated silicas may be considered for use in this invention such as, only for example herein, and without limitation, silicas from PPG Industries under the Hi-Sil trademark with designations Hi-Sil 210, Hi-Sil 243, etc; silicas from Rhodia as, for example, Zeosil 1165MP and Zeosil 165GR, silicas from Degussa AG with, for example, designations VN2, VN3 and Ultrasil 7005, as well as other grades of silica, particularly precipitated silicas, which can be used for elastomer reinforcement.

As hereinbefore discussed, various coupling agents may be used if desired. For example, a bis(3-trialkoxysilylalkyl) polysulfide having an average of 2 to 2.6 or of 3.5 to 4 connecting sulfur atoms in its polysulfide bridge, preferably from 2 to 2.6 sulfur atoms, may be used and particularly a bis(3-triethoxysilylpropyl) polysulfide.

It is readily understood by those having skill in the art that the nanocomposite, or rubber composite, would be compounded by methods generally known in the rubber compounding art, such as mixing the various sulfur-vulcanizable constituent rubbers with various commonly used additive materials such as, for example, curing aids, such as sulfur, activators, retarders and accelerators, processing additives, such as oils, resins including tackifying resins, silicas, and plasticizers, fillers, pigments, fatty acid, zinc oxide, waxes, antioxidants and antiozonants, peptizing agents and reinforcing materials such as, for example, carbon black. As known to those skilled in the art, depending on the intended use of the sulfur vulcanizable and sulfur vulcanized material (rubbers), the additives mentioned above are selected and commonly used in conventional amounts.

Typical amounts of tackifier resins, if used, comprise about 0.5 to about 10 phr, usually about 1 to about 5 phr. Typical amounts of processing aids comprise about 1 to about 50 phr. Such processing aids can include, for example, aromatic, napthenic, and/or paraffinic processing oils. Typical amounts of antioxidants comprise about 1 to about 5 phr. Representative antioxidants may be, for example, diphenyl-p-phenylenediamine and others, such as, for example, those disclosed in *The Vanderbilt Rubber Handbook* (1978), Pages 344 through 346. Typical amounts of antiozonants comprise about 1 to 5 phr. Typical amounts of fatty acids, if used, which can include stearic acid comprise about 0.5 to about 3 phr. Typical amounts of zinc oxide comprise about 1 to about 10 phr. Typical amounts of waxes comprise about 1 to about 5 phr. Often microcrystalline waxes are used. Typical amounts of peptizers comprise about 0.1 to about 1 phr.

The vulcanization is typically conducted in the presence of a sulfur vulcanizing agent, although peroxide and other non-sulfur curing agents may sometimes be suitably employed to vulcanize the elastomers. Examples of suitable sulfur vulcanizing agents include elemental sulfur (free sulfur) or sulfur donating vulcanizing agents, for example, an amine disulfide, polymeric polysulfide or sulfur olefin adducts. Preferably, the sulfur vulcanizing agent is elemental sulfur. As known to those skilled in the art, sulfur vulcanizing agents are used in an amount ranging from about 0.5 to about 4 phr, or even, in some circumstances, up to about 8 phr.

Accelerators are used to control the time and/or temperature required for vulcanization and to improve the properties of the vulcanizate. In one embodiment, a single accelerator system may be used, i.e., primary accelerator. Conventionally and preferably, a primary accelerator(s) is used in total amounts ranging from about 0.5 to about 4, preferably about 0.8 to about 1.5, phr. In another embodiment, combinations of a primary and a secondary accelerator might be used with the secondary accelerator being used in smaller amounts (of about 0.05 to about 3 phr) in order to activate and to improve the properties of the vulcanizate. Combinations of these accelerators might be expected to produce a synergistic effect on the final properties and are somewhat better than those produced by use of either accelerator alone. In addition, delayed action accelerators may be used which are not affected by normal processing temperatures but produce a satisfactory cure at ordinary vulcanization temperatures. Vulcanization retarders might also be used. Suitable types of accelerators that may be used in the present invention are amines, disulfides, guanidines, thioureas, thiazoles, thiurams, sulfenamides, dithiocarbamates and xanthates. Preferably, the primary accelerator is a sulfenamide. If a second accelerator is used, the secondary accelerator is preferably a guanidine, dithiocarbamate or thiuram compound.

The presence and relative amounts of the above additives are not considered to be an aspect of the present invention, unless otherwise indicated herein, which is more primarily directed to preparation of nanocomposites as well as rubber composites which contain such nanocomposites as well as manufactured articles, including tires, which have at least one component comprised of said nanocomposites and/or rubber composites.

The preparation of a rubber composite, namely the mixing of the rubber composition can be accomplished by methods known to those having skill in the rubber mixing art. For example, the ingredients are typically mixed in at least two stages, namely, at least one non-productive stage followed by a productive mix stage. The final curatives are typically mixed in the final stage which is conventionally called the "productive" mix stage in which the mixing typically occurs at a temperature, or ultimate temperature, lower than the mix temperature(s) than the preceding non-productive mix stage(s). The rubber, and fillers such as silica and silica treated carbon black and adhesive agent, are mixed in one or more non-productive mix stages. The terms "non-productive" and "productive" mix stages are well known to those having skill in the rubber mixing art.

The following examples are presented to illustrate the invention and are not intended to be limiting. The parts and percentages are by weight unless otherwise designated.

EXAMPLE I

A nanocomposite of styrene/butadiene elastomer which contains a homogeneous dispersion therein of intercalated montmorillonite clay and at least partially exfoliated platelets thereof is prepared in situ within a pre-formed styrene/butadiene elastomer host.

In particular, 400 grams of an aqueous cationic latex of an elastomeric copolymer of styrene and 1,3-butadiene of a weight ratio of styrene to butadiene units of about 25/75 is formed by preparing a mixture of water, free radical generating compound and cationic surfactant together with styrene and 1,3-butadiene monomers, and allowing the monomers to polymerize to form an aqueous, cationic latex of styrene/butadiene copolymer elastomer in a form of polymer particles. The cationic surfactant, in the presence of the polymer particles, functions to stabilize the polymer particles and to inhibit them from prematurely coagulating from the latex (e.g. destabilizing the latex). The cationic surfactant was cetyl trimethyl ammonium bromide. The latex contained about 22 weight percent of the elastomer based upon the latex. A free radical polymerization initiator system used was a combination of ferrous sulfate and diisopropylbenzene hydroperoxide. Tertiary dodecyl mercaptan was also used as a molecular weight regulator.

A water dispersion of montmorillonite clay particles, in the absence of an ion exchange promoting agent (e.g. in the absence of a quaternary ammonium salt) and at a concentration of about two weight percent of the clay based on the water plus clay, was heated to a temperature of about 80° C. and aggressively agitated. To the heated, agitated, water/clay dispersion, was slowly added, at a rate of about 5 grams per minute, about 250 grams of the latex. The latex itself had a temperature of about 25° C.

The cationic latex of the styrene/butadiene copolymer elastomer particles was slowly added to the relatively hot, agitated water/clay dispersion, was observed to coagulate and such coagulation was understood to be an inherent result of the ion exchange mechanism in which the cationic surfactant exchanged with the sodium ions in the expanded galleries of the stacked platelets of the clay, thereby destabilizing the latex while surface treating the clay. In this manner, the nanocomposite of elastomer host and in situ formed dispersion therein of intercalated and at least partially exfoliated clay platelets is formed in an in situ manner.

The resulting nanocomposite was then dried to remove the water.

It is considered herein that the cationic surfactant associated with the copolymer particles in the latex displaced the sodium ions contained in the galleries between the layers of platelets of the multilayered montmorillonite clay and thereby expanded the interlayer distance between said layers and thereby allowed the organoclay to become polymer-intercalated, all in situ within said copolymer elastomer host as the latex became destabilized as a result of the removal of the cationic surfactant from the presence of the polymer particles by the aforesaid ion exchange mechanism with the sodium ions of the montmorillonite clay and wherein the styrene/butadiene copolymer with the in situ formed dispersion of the nanocomposite and exfoliated platelets therein coagulated.

EXAMPLE II

Compositions of the nanocomposite prepared in Example I are prepared and identified herein as Control Sample A, Control Sample B and Sample C.

Control Sample A is prepared of an aqueous polymerization prepared styrene/butadiene copolymer elastomer to which 10 phr of carbon black (N299) is blended to provide carbon black reinforcement without the nanocomposite of Example I.

Control Sample B is prepared of an aqueous polymerization prepared styrene/butadiene copolymer elastomer to which 21.8 phr of a pre-treated clay (an obtained organoclay understood to have been prepared by pre-treating a clay of stacked platelets in a water medium with a quaternary ammonium salt and then drying the organoclay) is blended to provide a pre-treated clay, and exfoliated platelets thereof formed by the physical mixing thereof with the elastomer in this Example). The pre-intercalated clay was obtained as Cloisite 25A from the Southern Clay Products company.

Sample C represents the practice of this invention in which the nanocomposite of Example I is added in the preliminary mixing stage for the rubber mixing process.

The mixtures are illustrated in the following Table 1.

TABLE 1

| Material | Control Sample A | Parts Control Sample B | Sample C |
|---|---|---|---|
| Non-Productive Mixing Step (100° C.) | | | |
| Cationic SBR[1] | 100 | 100 | 0 |
| Carbon black[2] | 9.97 | 0 | 0 |
| Organoclay | 0 | 21.84 | 0 |
| Nanocomposite[3] | 0 | 0 | 114.4 |
| Productive Mixing Step (60° C.) | | | |
| Dicumyl peroxide[4] | 0.3 | 0.3 | 0.3 |

[1]Styrene/butydiene elastomer having a bound styrene content of about 25 weight percent, prepared by aqueous emulsion, free radical, polymerization in the presence of a cationic surfactant (cetyl trimethyl ammonium bromide) and coagulating the elastomer from the latex by addition of alcohol
[2]Carbon black as N299, an ASTM designation
[3]Nanocomposite of Example I comprised of 100 phr of the styrene/butadiene copolymer elastomer and a homogeneous dispersion therein of 14.4 phr of the in situ intercalated montmorillonite clay and partially exfoliated clay platelets
[4]Curative

EXAMPLE III

Various physical properties of the compositions prepared in Example II, are reported in the following Table 2. In the following Table 2 the terms "UTS" and "RPA" mean "Ultimate Tensile System" and "Rubber Processability Analyzer", respectively.

TABLE 2

| Properties | Control Sample A | Control Sample B | Sample C |
|---|---|---|---|
| UTS Determined Modulus/Tensile/Elongation | | | |
| 10% modulus (MPa) | 0.19 | 0.506 | 0.506 |
| 50% modulus (MPa) | 0.545 | 1.342 | 1.546 |
| 100% modulus (MPa) | 0.883 | 2.216 | 2.961 |
| 200% modulus (MPa) | 1.797 | 3.750 | 5.069 |
| 300% modulus (MPa) | 3.147 | 4.651 | 6.388 |
| Ult tensile strength (MPa) | 5.683 | 4.809 | 9.335 |
| Ult elongation (%) | 462.3 | 331.8 | 508.2 |
| RPA at 100° C., 11 Hertz | | | |
| G' at 1% strain (kPa)[1] | 398.46 | 818.18 | 881.94 |
| G' at 5% strain (kPa)[1] | 398.55 | 720.18 | 852.67 |
| G' at 10% strain (kPa)[1] | 392.13 | 656.75 | 815.74 |
| Tan delta at 1% strain[2] | 0.200 | 0.208 | 0.139 |

TABLE 2-continued

| Properties | Control Sample A | Control Sample B | Sample C |
|---|---|---|---|
| Tan delta at 5% strain[2] | 0.217 | 0.231 | 0.158 |
| Tan delta at 10% strain[2] | 0.216 | 0.236 | 0.165 |

[1]The G' values determined at one percent, five percent and 10 percent strains, or elongations, are a measure of Storage Modulus and are normally considered to be a measure of stiffness, wherein an increase of G' is a corresponding indication of an increase in stiffness of the rubber composition
[2]The Tan Delta at one percent, five and 10 percent strains, or elongations, are a ratio of Loss Modulus to Storage Modulus and are normally considered to be a measure of hysteresis wherein a lower hysteresis is typically desirable for better tire rolling resistance (less resistance to rolling) and therefore associated with better vehicular fuel economy. A decrease in the Tan Delta value is typically a corresponding indication of an decrease in hysteresis of the rubber composition It can be seen from Table 1 that Sample C, as compared to Control Sample B, has a significantly increased G', and therefore an indicated increased shear stiffness. This is considered herein to be significant and beneficial because increased shear stiffness is considered herein to be a typically desirable attibute for various components of a tire, including a tire tread, for tire performance.

It can also be seen from Table 1 that Sample C, as compared to Control Sample B, has a significantly increased tensile modulus, and therefore an indicated increased tensile stiffness, which is considered herein to be a typically desirable attribute for various components of a tire, including a tire tread, for tire performance.

For Sample C, a substantially increased ultimate tensile strength and elongation are evident as compared to Control Samples A and B which is indicative of substantial reinforcement of the elastomer by the dispersed clay particles (intercalated clay and clay platelets) beyond what may be obtained from conventional fillers such as carbon black (Control Sample A) and organoclay fillers (Control Sample B).

While various embodiments are disclosed herein for practicing the invention, it will be apparent to those skilled in this art that various changes and modifications may be made therein without departing from the spirit or scope of the invention.

What is claimed is:

1. A process of preparing a nanocomposite comprised of an elastomer and at least partially exfoliated platelets from a water-swellable clay which comprises blending:
   (A) an aqueous pre-formed elastomer latex comprised of elastomer particles with cations on the surface thereof prepared by aqueous free radical induced polymerization of monomers in the presence of a free radical generating polymerization initiator and surfactant;
   wherein said monomers are comprised of:
      (1) styrene and 1,3-butadiene monomers which contain from about 0.1 to about 40 weight percent styrene monomer,
      (2) styrene and isoprene monomers which contain from about 0.1 to about 40 weight percent styrene monomer,
      (3) isoprene monomer,
      (4) 1,3-butadiene monomer,
      (5) isoprene and 1,3-butadiene monomers,
      (6) 1,3-butadiene and acrylonitrile monomers which contain from about 5 to about 45 weight percent acrylonitrile monomer; or
      (7) isoprene and acrylonitrile monomers which contain from about 5 to about 45 weight percent acrylonitrile monomer wherein said free radical generating polymerization initiator is selected from:
         (1) a cationic aqueous polymerization initiator, or
         (2) an anionic aqueous polymerization initiator, or
         (3) neutral aqueous polymerization initiator, or
         (4) a redox free radical initiator system;
      wherein said elastomeric polymer particles are stabilized in said latex by a surfactant selected from:
         (1) non free-radically polymerizable cationic surfactant, and/or
         (2) free-radically polymerizable cationic surfactant;
   (B) an aqueous mixture of water and a multilayered water-swellable clay which contains cationically exchangeable ions in its galleries between said layers, exclusive of an intercalant for said clay, wherein said water-swellable clay is comprised of a plurality of stacked platelets with water-swollen galleries between said platelets.

2. The process of claim 1 wherein said monomer(s) is 1,3-butadiene or combination of styrene and 1,3-butadiene monomers.

3. The process of claim 1 which comprises a combination of:
   (A) ion transfer mechanism of the cationically exchangeable ions (e.g. sodium ions) in the galleries between the stacked platelets of the water-swellable clay and the cationic surfactant,
   (B) a destabilization of the elastomer latex and thereby a destabilization of the elastomer particles,
   (C) the migration of the elastomer particles into the galleries between the platelets of the swollen, intercalated clay to aid in forming polymer-bound platelets
   (D) and a substantial exfoliation of the polymer-bound platelets within the elastomer host and
   (E) coagulation of the elastomer particles from the destabilized elastomer latex.

4. The process of claim 1 wherein said monomers for the said pre-formed elastomer also contain:
   (A) from about 0.1 to about 20 weight percent, based upon the total monomers, of an additional copolymerizable monomer, selected from at least one of alkyl acrylates, alkyl methacrylates, acrylamide, methacrylamide, N-alkylacrylamide, N-alkyl methacrylamide, N,N-dialkyl acrylamide and N,N-dialkyl methacrylamide, wherein said alkyl groups contain from one through four carbon atoms; alpha methylstyrene, 2-vinyl pyridine and/or 4-vinyl pyridine, and/or;
   (B) from about 0.1 to about 20 weight percent, based on the total monomers, of an elastomer functionalizing monomer selected from hydroxypropyl acrylate, hydroxypropyl methacrylate (HPMA), 2-(dimethylamino) ethyl methacrylate, 4-anilinophenyl methacrylamide, 2-hydroxyethyl acrylate and 2-hydroxyethyl methacrylate.

5. The process of claim 1 wherein said free radical generating polymerization initiator is
   (A) a cationic aqueous polymerization initiator selected from at least one of 2,2'azobis(2-methylpropionamidine) dihydrochloride and 2,2'azobis (N,N' dimethyleneisobutyramidine) dihydrochloride,
   (B) an anionic aqueous polymerization initiator selected from at least one of potassium peroxydisulfate and ammonium peroxydisulfate
   (C) a neutral free radical aqueous polymerization initiator selected from at least one of benzoyl peroxide and azobisisobutyrolnitrile, or (D) a redox polymerization system.

6. The process of claim 1 wherein said surfactant(s) is (are) comprised of said non-free radically polymerizable cationic surfactant and/or free radically polymerizable cationic surfactant and from about 1 to about 20 weight percent non-ionic surfactant (based upon the total of said surfactants).

7. The process of claim 1 wherein said surfactant is:
(A) a free radically polymerizable cationic surfactant selected from at least one of alkyl bromide (or chloride) quaternary salts of 2-dimethylaminoethyl methacrylate, polymerizable acrylate and methacrylate mono and diquaternary ammonium salts, alkyl bromide (or chloride) quaternary salts of meta or para vinylbenzene dimethylamine, alkyl bromide (or chloride) quaternary salts of N,N dimethylallylamine, alkyl bromide (or chloride) quaternary salts of ortho or para vinyl pyridine, alkyl bromide (or chloride) salt of vinyl imidazole, N-((11-methacryloyloxy) undecyl)-4-methyl pyridinium bromide, 5-(para vinyl phenyl) pentyltrimethylammonium bromide, 11-methacrylolyundecyltrimethylammonium bromide, 11-acryloylundecyltrimethylammonium bromide, vinylbenzylamine hydrochloride, and aminoethyl-methacrylate hydrochloride, or
(B) a non free-radically polymerizable cationic surfactant as cetyltrimethylammonium bromide (CTAB) or cetyltrimethylammonium chloride.

8. The process of claim 1 wherein said cation-containing chain transfer agent is 2-aminophenyldisulfide dihydrochloride.

9. The process of claim 1 wherein said process further comprises:
(A) using an emulsion stabilizing amount of said cationic surfactant in said latex for said polymerization of said monomers to prevent coagulation of resultant elastomer particles from said latex,
(B) following completion of said polymerization of said monomers, adding an increased amount of the same or additional cationic surfactant to said latex to increase the amount of cationic surfactant available for ion exchange with cationic exchangeable ions contained in the galleries of said water-swellable clay, and thereafter,
(C) blending said resulting latex with said water-swellable clay in an amount of said clay based upon substantially equivalent cationic ions of total of said cationic surfactant(s) to said cationic ion exchangeable ions in said galleries of said clay.

10. The process of claim 1 wherein said water swellable clays are selected from at least one of water-swellable smectite clays, vermiculite and mica clays.

11. The process of claim 1 wherein said water-swellable clay is a smectite clay selected from at least one of montmorillonite, hectorite, nontrite, beidellite, volkonskoite, saponite, sauconite, sobockite, sterensite, and sinfordite clays.

12. The process of claim 1 wherein ions contained in the galleries of said water-swellable clay between its platelets are comprised of at least one of sodium ions and potassium ions.

13. The process of claim 3 wherein said water swellable clays are selected from at least one of water-swellable smectite clays, vermiculite and mica clays.

14. The process of claim 3 wherein said water-swellable clay is a smectite clay selected from at least one of montmorillonite, hectorite, nontrite, beidellite, volkonskoite, saponite, sauconite, sobockite, sterensite, and sinfordite clays.

15. The process of claim 3 wherein ions contained in the galleries of said water-swellable clay between its platelets are comprised of at least one of sodium ions and potassium ions.

16. A nanocomposite prepared by the process of claim 1.
17. A nanocomposite prepared by the process of claim 3.
18. A nanocomposite prepared by the process of claim 5.
19. A nanocomposite prepared by the process of claim 9.

20. A rubber composite comprised of a blend of said nanocomposite of claim 16 and additional elastomer(s) and/or additional particulate reinforcing filler.

21. A rubber composite comprised of a blend of said nanocomposite of claim 19 and additional elastomer(s) and/or additional particulate reinforcing filler.

22. A rubber composite comprised of a blend of said nanocomposite of claim 17 and additional elastomer(s) and/or additional particulate reinforcing fillers.

23. A rubber composite comprised of a blend of said nanocomposite of claim 18 and additional elastomer(s) and/or additional particulate reinforcing fillers.

24. A rubber composition which comprises, based upon parts by weight per 100 parts by weight elastomer (phr):
(A) about 5 to about 150 phr of the nanocomposite of claim 16,
(B) from zero to about 95 phr of at least one additional diene-based elastomer, so long as the total of the elastomer contained in said nanocomposite and said additional diene-based elastomer is 100 parts by weight,
(C) from zero to about 80 phr of at least one additional reinforcing particulate filler selected from carbon black, precipitated silica aggregates, silica-containing carbon black which contains domains of silica on its surface, and mixtures thereof, and, optionally
(D) a coupling agent which contains a moiety reactive with hydroxyl groups contained on the peripheral edges of the surface of the platelets of said exfoliated platelets and reactive with hydroxyl groups contained on the surface of said precipitated silica and said silica-containing carbon black, and another moiety which is interactive with said diene-based elastomer(s) of the elastomer(s) of said nanocomposite and at least one of said additional elastomers if said additional elastomer is used.

25. The rubber composition of claim 24 wherein said additional conjugated diene-based elastomers are selected from at least one of cis 1,4-polyisoprene natural and synthetic, cis 1,4-polybutadiene, styrene/butadiene copolymers aqueous emulsion polymerization prepared and organic solvent solution polymerization prepared, medium vinyl polybutadiene having vinyl 1,2-content in range of about 15 to about 90 percent, isoprene/butadiene copolymers, styrene/isoprene/butadiene terpolymers and tin coupled elastomers selected from tin coupled organic solution polymerization prepared styrene/butadiene co-polymers, isoprene/butadiene copolymers, styrene/isoprene copolymers, polybutadiene and styrene/isoprene/butadiene terpolymers.

26. An article of manufacture having at least one component comprised of
(A) said nanocomposite of claim 16, or
(B) a blend of said nanocomposite of claim 13 and at least one additional elastomer and/or reinforcing filler.

27. A tire having at least one component comprised of:
(A) said nanocomposite of claim 16, or
(B) a blend of said nanocomposite of claim 16 and at least one additional elastomer and/or reinforcing filler.

* * * * *